(12) United States Patent
Heine et al.

(10) Patent No.: US 7,365,678 B2
(45) Date of Patent: Apr. 29, 2008

(54) DETERMINING USABILITY OF A NAVIGATION AUGMENTATION SYSTEM

(75) Inventors: David R. Heine, Fullerton, CA (US); Thomas D. Springsteen, Diamond Bar, CA (US); Jeffrey W. Lewellen, West Covina, CA (US); Walter M. Golonka, Diamond Bar, CA (US)

(73) Assignee: Raytheon Company, Waltham, MA (US)

( * ) Notice: Subject to any disclaimer, the term of this patent is extended or adjusted under 35 U.S.C. 154(b) by 262 days.

(21) Appl. No.: 11/290,613

(22) Filed: Nov. 30, 2005

(65) Prior Publication Data
US 2006/0158372 A1 Jul. 20, 2006

Related U.S. Application Data

(60) Provisional application No. 60/636,778, filed on Dec. 16, 2004.

(51) Int. Cl.
*G01S 5/14* (2006.01)
(52) U.S. Cl. .............................. 342/357.02; 342/357.03
(58) Field of Classification Search ............. 342/357.2, 342/357.03, 357.09
See application file for complete search history.

(56) References Cited

U.S. PATENT DOCUMENTS

| | | | |
|---|---|---|---|
| 5,600,329 A | | 2/1997 | Brenner et al. |
| 5,936,573 A | * | 8/1999 | Smith .......................... 701/213 |
| 6,744,406 B2 | * | 6/2004 | Kalafut et al. ............... 342/386 |
| 6,809,683 B2 | * | 10/2004 | Strangeland et al. ... 342/357.02 |
| 6,826,476 B2 | * | 11/2004 | Ahlbrecht et al. ........... 701/213 |
| 2003/0011511 A1 | | 1/2003 | King et al. |
| 2004/0095271 A1 | | 5/2004 | Stangeland et al. |
| 2004/0119638 A1 | | 6/2004 | Fagan et al. |

OTHER PUBLICATIONS

Pullen, S. et al, "A Comprehensive Integirty Verification Architecturefor On-Airport LAAS Category III Precision Landing," ION GPS-96 COnf Sep. 1996.*
Pullen, S. et al "Simulation-Based Evaluation of WAAS Performance: Risk and Integrity Factors," ION GPS-94, Sep. 1994.*
Jubin, J. et al, "Wide Area Differential GPS Reference Station Placement," IEEE Plans '96, Apr. 1996.*
Search Report and Written Opinion for PCT/US2005/045613 dated Aug. 11, 2006.
Search Report and Written Opinion for PCT/US2005/044517 dated Jul. 6, 2006.

* cited by examiner

*Primary Examiner*—Gregory C Issing
(74) *Attorney, Agent, or Firm*—Daly, Crowley, Mofford & Durkee, LLP

(57) ABSTRACT

In one aspect, the invention is the system for assessing a navigation augmentation environment. The system includes a reference station for receiving messages from a satellite. The reference station has a known position. The system also includes a simulator for simulating an augmentation system by determining corrections based on the messages received and the known position of the reference station. The system further includes a monitoring system to render the corrections to a user in a form enabling determination of the usability of the augmentation system in the navigation augmentation environment.

21 Claims, 7 Drawing Sheets

DETERMINING USABILITY OF A NAVIGATION AUGMENTATION SYSTEM

RELATED APPLICATIONS

This application claims priority to provisional application Ser. No. 60/636,778, entitled "SYSTEM AND METHOD FOR DETERMINING AUGMENTATION SYSTEMS USABILITY WITHIN GEOGRAPHICAL REGIONS OF THE EARTH", filed Dec. 16, 2004, which is incorporated herein in its entirety.

TECHNICAL FIELD

The invention relates to navigation systems, and more particularly, to global navigation satellite systems.

BACKGROUND

A Global Navigation Satellite System (GNSS) transmits ranging signals, which are used by land, sea and air users to determine a three-dimensional position, a velocity and a time of day. The GNSS includes a network of satellites to transmit the ranging signals. One example of a GNSS is a Global Positioning System (GPS). The GPS includes 24 satellites, called GPS satellites, which operate in medium earth orbit.

The GNSS may be accurate to no more than 10 meters due to errors such as from ephemeris data, satellite clocks, ionosphere, troposphere, multi-path and receiver noise. Thus, the GNSS by itself may not be accurate enough for certain users that require better accuracy, for example, aircraft. Other systems called augmentation systems adjust for these errors and broadcast them to users. A typical augmentation system for a GPS includes one or more reference stations having GPS receivers that receive GPS messages (i.e., ranging signals) from the GPS satellites. The precise locations of the reference stations are known. A master control station receives the GPS data from the reference stations and determines for each GPS satellite the bias based on the reference station's known location and the GPS satellite's determination of the reference station's position. The master control station determines a range error for each GPS satellite, and broadcasts the integrity data and corrections, which will eventually be received by a user.

One known augmentation system is the satellite-based augmentation system (SBAS). In the SBAS system, the master control station sends integrity data and corrections to geosynchronous earth orbit (GEO) satellites for broadcast to the users on the same frequency and in a similar format to GPS satellites. This method allows both SBAS GEO signals and GPS signals to be received via the user's GPS receiver, and has the added benefit of providing additional satellite ranging sources to improve availability. Wide-area coverage is only limited by the footprint of the SBAS GEO satellite (which spans approximately +/−76 degrees in longitude and latitude) and the quantity and location of the SBAS reference stations within the GEO footprint (i.e., range). Thus, a single SBAS may be used to service a nation or a continent.

Another known augmentation system is the ground-based augmentation system (GBAS). A typical GBAS includes a series of reference stations having GPS receivers located around a local area (e.g., 20 or 30 miles). The GPS receivers forward the GPS data to the master control station, which processes the GPS data and broadcasts the information using a very high frequency (VHF) data broadcast to an aircraft. The GBAS can provide local area augmentation with integrity data and corrections for GPS satellites to users in the immediate vicinity of an airport via a VHF data link. Since the GBAS is utilized in a local area, a much higher degree of fidelity may be placed on the accuracy and integrity information provided to the aircraft for navigation, and a much more rapid response to fault conditions (i.e., time-to-alert) can be achieved.

A further known augmentation system that does not use a reference station is the air-based augmentation system (ABAS). The ABAS typically uses the GPS signals from GPS satellites and user avionics to augment the GPS signal. The ABAS uses a Receiver Autonomous Integrity Monitoring (RAIM) to perform integrity monitoring. Since the RAIM is based on comparing the results of multiple combinations of GPS satellites, the ABAS requires more GPS satellites in view than the minimum four required for basic position fixing. Hence, the ABAS gains its additional integrity at the expense of reduced availability. The ABAS may also utilize an airborne inertial navigation system (INS) to improve availability and continuity.

SUMMARY

When deciding to implement an augmentation system, a user is not able to determine whether the augmentation system will be usable in a particular geographic environment. The augmentation system is expensive and the errors introduced within a certain geographic region are difficult to determine. Even after purchasing and installing the augmentation system, the user may not be able to determine that the installed augmentation system performs as expected.

Described herein is a novel way for the user to determine the usability of an augmentation system within a geographic area before purchasing the augmentation system. Once installed, the user may determine whether the augmentation system purchased performs as expected.

In one aspect, the invention is a system for assessing a navigation augmentation environment. The system includes a reference station for receiving messages from a satellite. The reference station has a known position. The system also includes a simulator for simulating an augmentation system by determining corrections based on the messages received and the known position of the reference station, and a monitoring system to render the corrections to a user in a form enabling determination of the usability of the augmentation system in the navigation augmentation environment.

In another aspect, the invention is a method for assessing a navigation augmentation environment. The method includes receiving messages from a satellite from a reference station having a known position. The method also includes simulating an augmentation system by determining corrections based on the messages received and the known position of the reference station, and rendering the corrections to a user in a form enabling determination of the usability of the augmentation system in the navigation augmentation environment.

One or more of the aspects above may have one or more of the following features. 13. One feature includes simulating the augmentation system including simulating a certified augmentation system using software having the same functionality as software from a certified augmentation system. Receiving satellite messages from a reference station may include receiving satellite messages from a mobile reference station. Receiving may also include receiving the messages from different sources using different formats and configuring the messages into a common format. Receiving may further include filtering messages from one or more different sources. Other features include storing the messages received and sending stored messages or live messages to the simulator.

Further features include the reference station as a first reference station and receiving corrections from a host satellite-based augmentation system (SBAS), receiving messages from a second reference station associated with the host SBAS and rendering data for determining the usability of the second reference station. Still further features include receiving corrections from a host ground-based augmentation system (GBAS), receiving messages from a third reference station associated with the host GBAS and being connected to the receive manager and rendering data for determining the usability of the third reference station.

Other features include sending corrections from the host SBAS and the host GBAS to an aircraft. The one or more different sources may be from the first reference station, the second reference station, the third reference station, the host GBAS and the host SBAS. Still other features include receiving corrections from a host GBAS, receiving messages from a second reference station associated with the host GBAS and rendering data for determining the usability of the second reference station.

One or more of the aspects above may have one or more of the following advantages. The system provides a cost effective means for defining and evaluating augmentation architecture tradeoffs for GNSS service availability in any given area or region of interest. The system can be used to independently evaluate various combinations of stand-alone and expanded augmentation systems without impacting operations of host augmentation systems. The utility of the system does not end once an operational system is deployed. The system can continue to be used for training, terminal and approach/departure procedure development, and evaluations of new augmentation systems. The advantages listed are not intended to include each and every advantage. Other advantages will be apparent to one skilled in the art in light of the claims, drawings and description.

DETAILED DESCRIPTION

Figure 1:
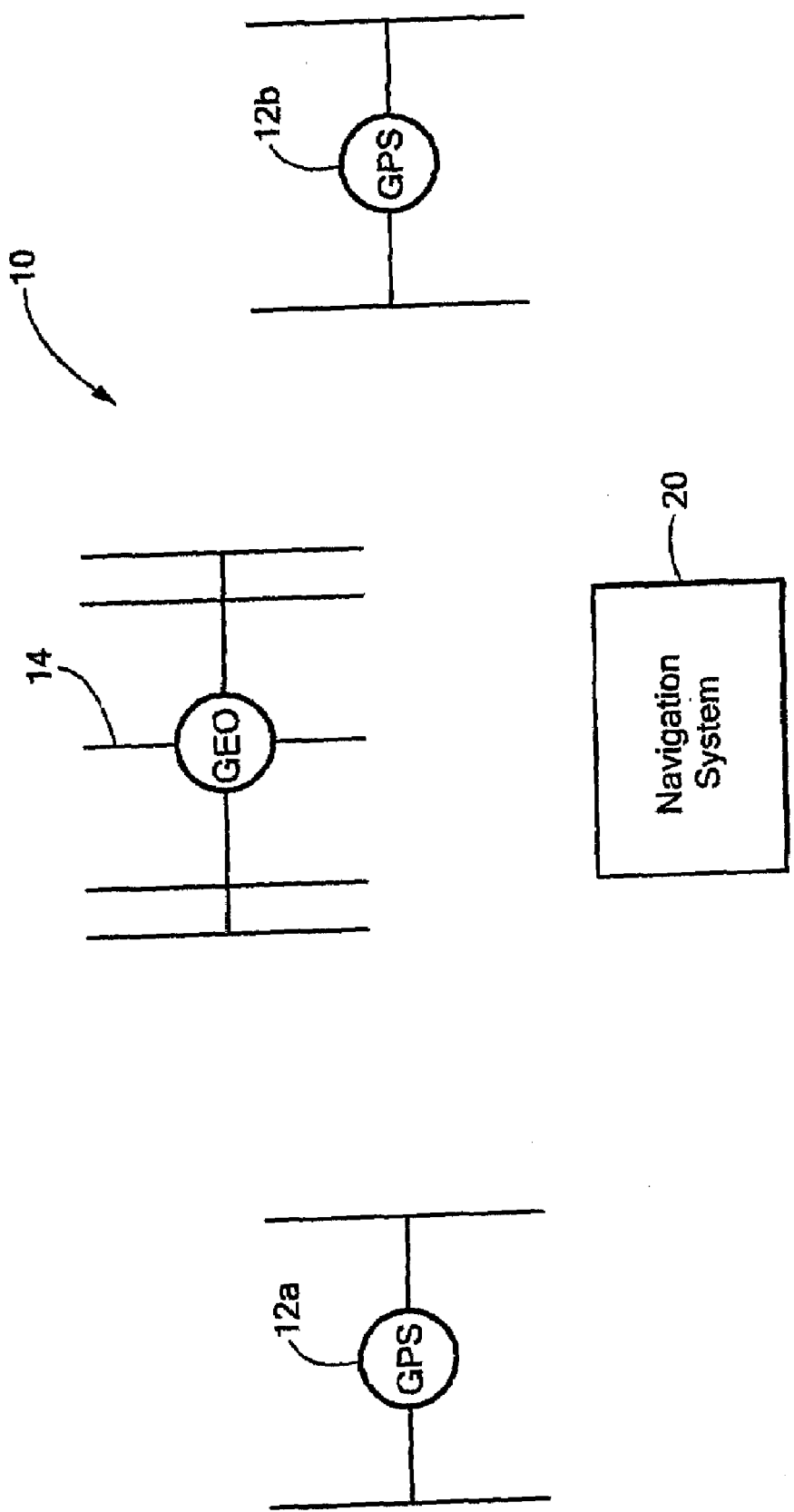
FIG. 1 is a diagrammatic view of a navigation environment.

Referring to FIG. 1, a navigation environment 10 includes Global Positioning System (GPS) satellites (e.g., GPS satellite 12a and GPS satellite 12b) and a geo-synchronous earth orbit (GEO) satellite 14, which are in view (i.e., within range or line of sight) of a navigation system 20. The system 20 is used to determine whether the navigation environment at a particular location is suitable for a satellite-based augmentation system (SBAS). For example, the system 20 determines, based on receiving GPS messages (e.g., ranging signals) from the GPS satellites 12a and 12b, whether an SBAS may be installed at the particular location in order to determine corrections. As will be disclosed below, the system 20 may also be used to determine a preferred positioning of a reference station.

Even though the system described herein initially describes a system for determining the usability of installing an SBAS into a particular geographic region, the system 20 may be used to test the usability of other augmentation systems. As will be described herein, the system 20 may be used to integrate other different or similar augmentation systems (e.g., air-based augmentation system (ABAS), ground-based augmentation system (GBAS)). The system described herein is in a GPS; however, any GNSS may be used.

Figure 2:
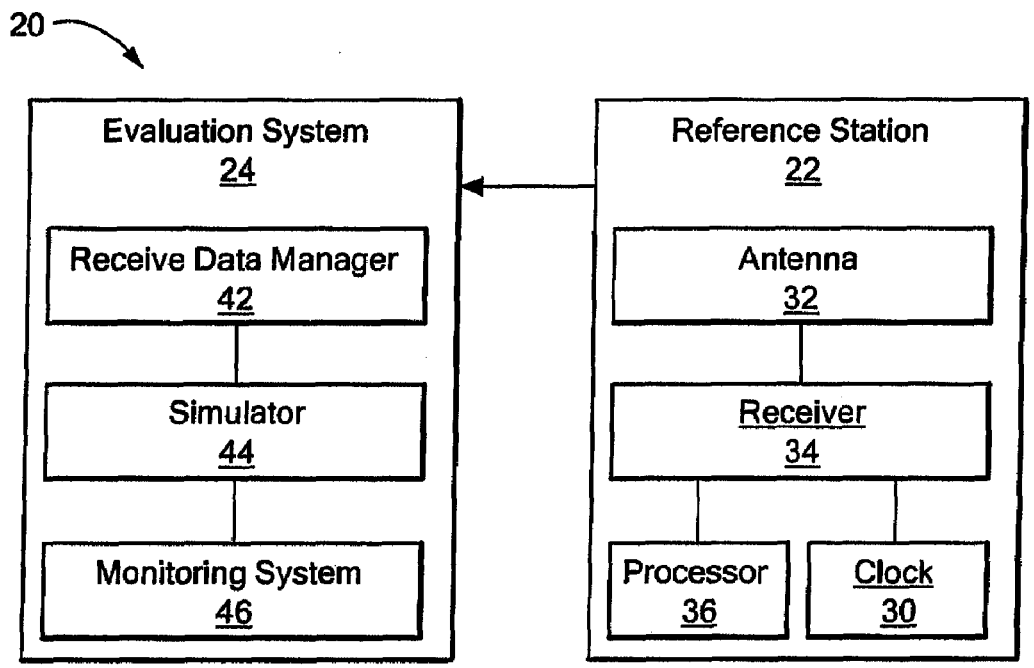
FIG. 2 is a diagrammatic view of a navigation system.

Referring to FIG. 2, navigation system 20 includes a navigation system reference station (NSRS) 22 and an evaluation system 24. The NSRS 22 includes an omni-directional antenna 32 for receiving GPS messages (i.e., ranging signals) from GPS satellites 12a and 12b (FIG. 1), a receiver 34 for decoding the GPS messages from a radio frequency (RF) message into a digital message, a processor 36 for filtering the digital message and a frequency clock 30 connected to the receiver 34 for synchronizing with the GPS satellites 12a and 12b.

In one particular embodiment, the NSRS 22 is a mobile reference station and may be set-up and operational in about two hours. The NSRS 22 also may be moved to different sites to determine which site is the preferred site in an augmentation system for a permanent reference station to be located and allows multiple sites to be evaluated in a relatively short time period without permanent installation delays and cost. The mobility of the NSRS 22 also allows for a quick response to multi-path errors when detected by easily moving the NSRS 22 until a position where minimal multi-path error is found. There are no facility requirements for the NSRS 22 so that the NSRS 22 may be quickly installed in an open area or on a facility. An installation of the NSRS 22 may be limited by the satellite visibility of antenna 32 and local multi-path factors.

The evaluation system 24 includes a receive data manager (RDM) 42, a simulator 44 and a monitoring system 46. The RDM 42 receives the GPS messages from the NSRS 22. The RDM 42 may also collect messages from multiple different sources, each having their own protocol. The RDM 42 converts the messages with the multiple protocols or message formats into a common format for use by the simulator 44.

The RDM 42 is configured to record the GPS messages and to playback stored GPS messages to the simulator 44. This enables a user of system 20 to search for a particular event and play back the particular event in real time for analysis. The RDM 42 may also send to the simulator 44 stored GPS messages or live GPS messages.

The simulator 44 simulates a certified SBAS by executing similar software that a certified SBAS would use. A certified SBAS system means that the SBAS software and hardware have been certified by an independent entity (e.g., Federal Aviation Administration (FAA)). However, the software executed by the simulator 44 is not certified for use with the hardware in system 20, but executing the simulator software provides an accurate representation of what certified software behavior would be when it is running in the navigation environment. The simulator software contains all the common filters and all of the specifics associated with monitoring the GPS signals including adding integrity to the GPS signals. The simulator 44 produces the corrections for the ranging errors associated with each of the satellites that are being monitored. The ranging errors include but are not limited to horizontal and vertical positioning errors.

The monitoring system 46 includes a graphical user interface (GUI) 52 and a display 54. Using the GUI 52, the user may select a presentation of the simulator output in human interpretable format, which is rendered on the display 54. For example, the presentation may be Stanford integrity plots. The presentation may also be other plots, which graphically illustrate the usability of the augmentation system (e.g., plots depicting horizontal and vertical errors). In another example, monitoring system 46 renders graphs, which depict a percentage of the time a signal is broadcasting error messages.

In other embodiments, additional reference stations may be added so that all the reference stations may be monitored in real-time.

Figure 3:
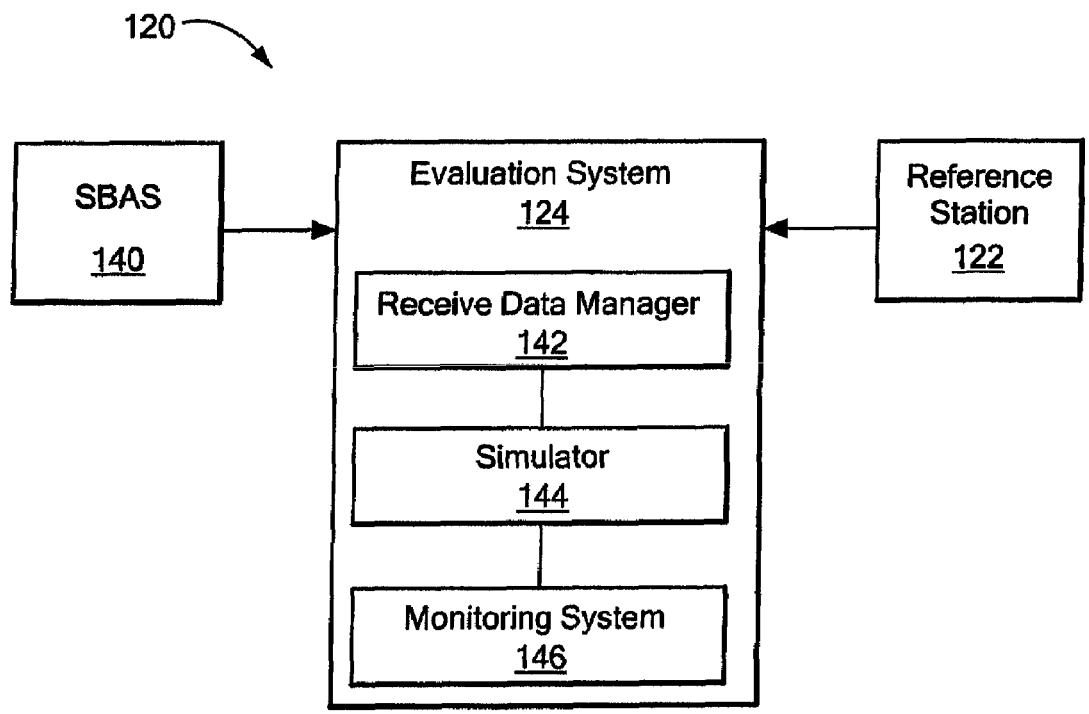
FIG. 3 is a diagrammatic view of another embodiment of the system.

Referring to FIG. 3, in another embodiment, the system 120 includes a NSRS 122, an evaluation system 124 and an SBAS 140. The evaluation system 124 includes a receive data manager 142, a simulator 144 and a monitoring system 146. In this embodiment, the evaluation system 124 may receive SBAS data (e.g., corrections) directly from the SBAS 140. The SBAS data may be received from a GEO satellite (not shown) or through a data link 160 from an SBAS ground station (not shown) within SBAS 140.

The RDM 142, in addition to stop and playback capabilities, has the capability to filter-out specific sources in the output data stream. The sources may be one or more reference stations (e.g., NSRS 122) or data from an augmentation system (e.g., SBAS 140). For example, if an operator suspects a problem with a particular reference station, the operator can filter-out the particular reference station during an analysis to determine if the reference station was the actual cause of the problem.

The monitoring system 146 renders real time displays of service availability contours and related metrics such as horizontal protection limits (HPL)/vertical protection limits (VPL) integrity metrics.

Figure 4:
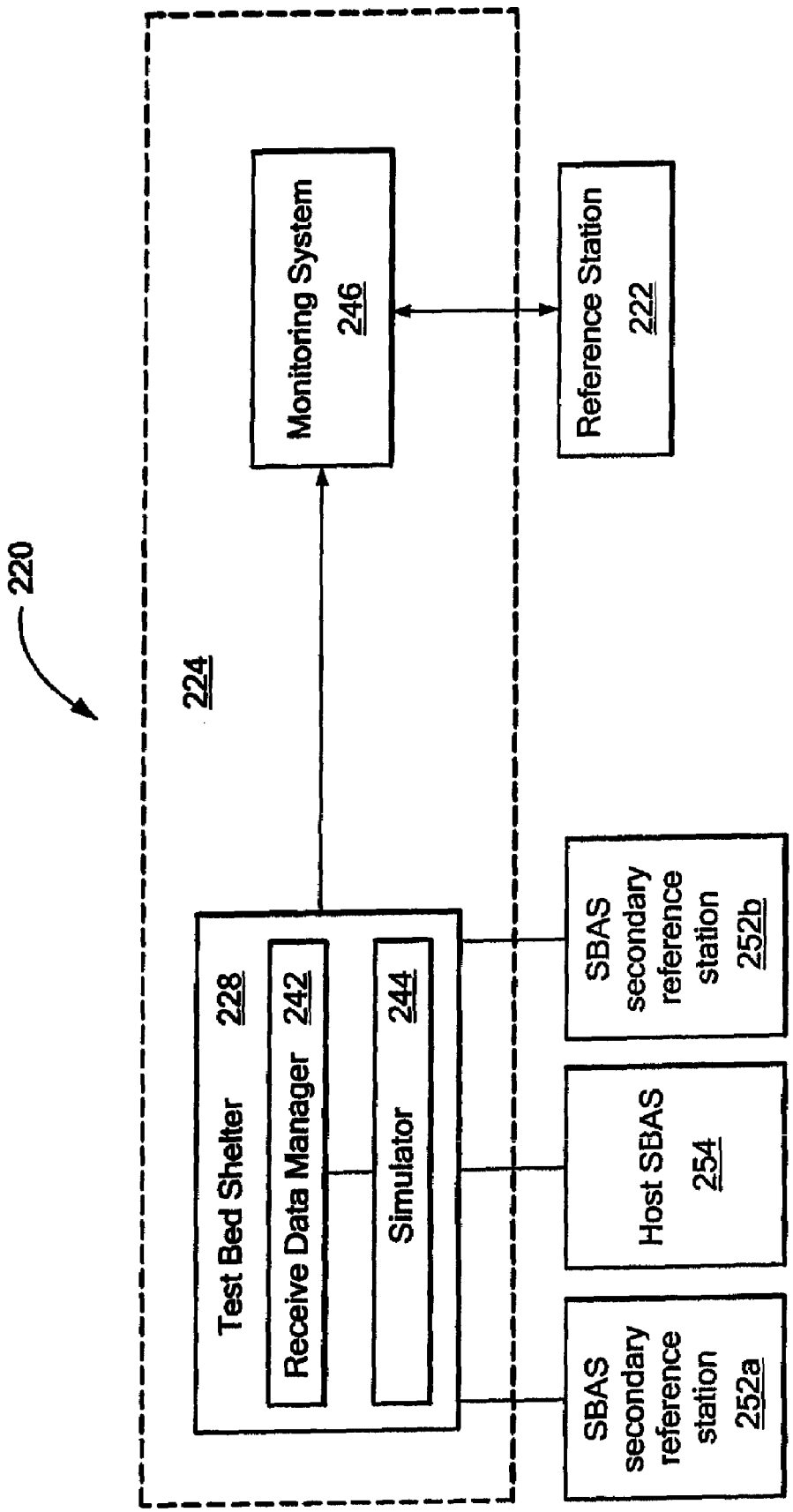
FIG. 4 is a diagrammatic view of the system with a host SBAS.

Referring to FIG. 4, in another embodiment, the system 220 includes an evaluation system 224, a NSRS 222, SBAS secondary reference stations (e.g., SBAS secondary reference station 252a and SBAS secondary reference station 252b) and a host SBAS 254. The evaluation system 224 includes a monitoring system 246 and a shelter 228. The monitoring system 246 may be located separately from the shelter 228 and may be connected to the shelter 228 by a data line 250 (e.g., a T1 line). The monitoring system 246 may be located inside a facility where technical personnel would conduct an evaluation of the usability of an augmentation system. The shelter 228 includes a RDM 242 and a simulator 244.

The local reference station 222 directly supporting the monitoring system 246 may be located with the shelter 228 to minimize communication line dependencies. In one embodiment, the shelter 228 is portable and environmentally controlled structure, which may be placed in any convenient location with power and adequate communication support.

The system 220 may be used to determine the benefits of adding SBAS secondary reference stations 252a and 252b to the host SBAS 254, which have a GEO footprint covering the navigation environment. This capability allows optimization and trade-off analysis to be conducted for determining the quantities and locations of SBAS secondary reference stations 252a and 252b within the navigation environment in a non-intrusive manner with the host SBAS 254. For example, system 220 may be used to determine the best sites to position additional SBAS reference stations while not interrupting operations conducted at the host SBAS 254. In one embodiment, the shelter 228 is capable of hosting up to as many as forty SBAS secondary reference stations. In one embodiment, the RDM 242 has the ability to selectively filter out one or more of the secondary SBAS reference station 252a and 252b.

Figure 5:
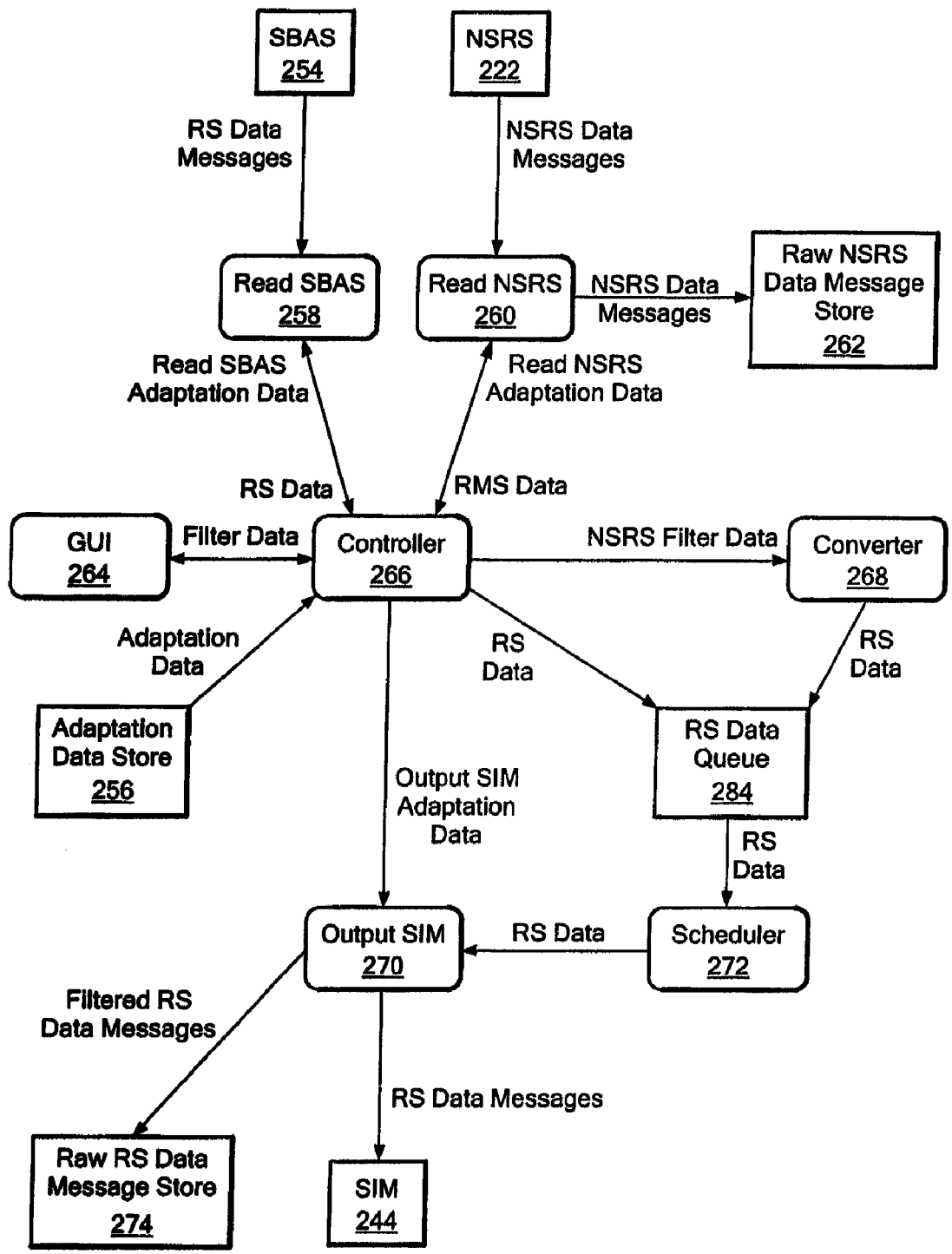
FIG. 5 is a diagrammatic view of a data flow in a receive data manager.

FIG. 5 is a data flow for software processes and data storage for the RDM 242. The processes and the data storage for the RDM 242 include an adaptation data store 256, a read SBAS process 258, a read NSRS process 260, a raw NSRS data message store 262, a GUI process 264, a controller process 266, a converter process 268, an output SIM process 270, a scheduler process 272, a raw reference station (RS) data message store 274 and a RS data queue 284.

The adaptation data store 256 includes configurable parameters. One configurable parameter is a node database parameter. The node database parameter includes a list of node names, IDs, and active status that match the names and IDs of the simulator 244. The node database parameter is used for start-up filtering configuration. Another configurable parameter is a recording files parameter which enables recording of raw NSRS data and RS data with converted NSRS data. A further configurable parameter is an archive period parameter, which is a period of time recording occurs before starting a new recording session and archiving the previous session to mass storage. Other configurable parameters include a recording filters parameter which is a list of node IDs to filter from recording files; a "NSRS receiver IDs to RS ID Mappings" parameter used when converting NSRS data which maps the NSRS node IDs to the RS node IDs used by the simulator 244; and a channel addressing parameter for channel addresses used to read the data from the Evaluation System local area network.

The read SBAS process 258 reads the SBAS messages from the network based on the adapted channel addresses, filters out the adapted/user controlled messages and sends the data to the converter process 268. The read SBAS process 258 includes read SBAS adaptation data which includes the adapted channel addresses used to establish communication and the adapted/user controlled filters based on the node IDs. The read SBAS process 258 also includes RS data messages which include SBAS messages from a fielded SBAS system. The read SBAS process 258 further includes RS data which includes RS data read from an RS channel (e.g., data line 250) which is sent to the controller process 266 for processing.

The read NSRS process 260 reads NSRS data messages from the NSRS 222 based on the adaptable channel addresses and associates the adaptable simulator node IDs with the NSRS receiver IDs. If recording is enabled, then the read NSRS process 260 generates a raw NSRS data message store 262 to store the messages. A read NSRS adaptation data includes the channel addresses used to establish communication and adapted NSRS receiver ID to node IDs mapping. The NSRS data messages include NSRS data sent to the controller process 266.

The GUI process 264 allows the user to shutdown the RDM 242 and to change the filters associated with the data being sent to the simulator 244. At startup, the filters rendered by the GUI process 264 are initially populated with the filters from the adaptation data store 256 read by the controller process 266. As the filters are modified by the user, filter data is sent back to the controller process 66 to be distributed to the processes using the filters.

The controller process 266 starts the RDM 242 and routes the data amongst all the processes. The controller process 266 reads SBAS adaptation data which includes the adapted channel addresses used to establish communication and the adapted/user controlled filters based on the node IDs. The data is taken from the adaptation data and sent to the read SBAS process 258. The controller process 266 reads NSRS adaptation data which includes the channel addresses used to establish communication and adapted NSRS receiver ID to node IDs mapping. The data is taken from the adaptation data and sent to the Read NSRS 260. The controller 266 filters data received from the adaptation data and sends the filtered data to the GUI process 264 for initial population of the filter dialog. The SBAS RS data is received from the read SBAS process 258 and put in a time ordered RS data queue 284 to await output to the simulator 244. The NSRS data read from the read NSRS process 260 is sent to the converter process 268 for conversion into RS Data. The filter data read from the adaptation data and modified by the user through the GUI process 264 are sent to the converter process 268.

The converter process 268 converts the NSRS data received by the controller process 266 into RS data and filters out the converted NSRS data to be sent to the simulator 244. The NSRS data read from the controller process 266 is converted into RS data, which is put in a time ordered RS data queue 284. The filter data read from the converter process 268 is applied to the converted data to prevent output of filtered data to the simulator 244. The converted RS data is sent to the time ordered RS data queue 284.

The output SIM process 270 establishes, at startup, the adapted communication channels for sending to the simulator 244. The filters to apply for the adapted and selected RS Data Messages are read from the controller process 266. While running, the output SIM process 270 sends the RS data messages to the simulator 244 from the RS data queue 284, saving the unfiltered messages if recording is enabled. The output SIM process 270 receives output SIM adaptation data read from the controller process 266, the adapted communication channels for communicating with the simulator 244 and the adaptable filters for recorded output traffic. The output SIM process 270 schedules the RS data (SBAS and converted NSRS Data) to be sent to the simulator 244. The output SIM process 270 also sends RS data messages which are the RS data encapsulated in a simulator friendly format to the simulator 246. If recording is enabled, the RS data messages are also sent to the raw RS data message store 274.

The scheduler process 272 reads the RS Data in the RS data queue 284 and at the scheduled epoch and sends the data to output SIM process 270. The RS Data includes an epochs worth of RS Data from the RS data queue 284 and sent to output SIM process 270.

The raw RS data message store 274 is generated by the output SIM process 270 if recording is enabled. The raw RS data message store 274 saves a filtered set of RS data messages sent to the simulator 246. The messages may be used for playback at a later time. The raw RS data message store 274 includes filtered RS data messages which are the adapted selected set of messages.

Figure 6:
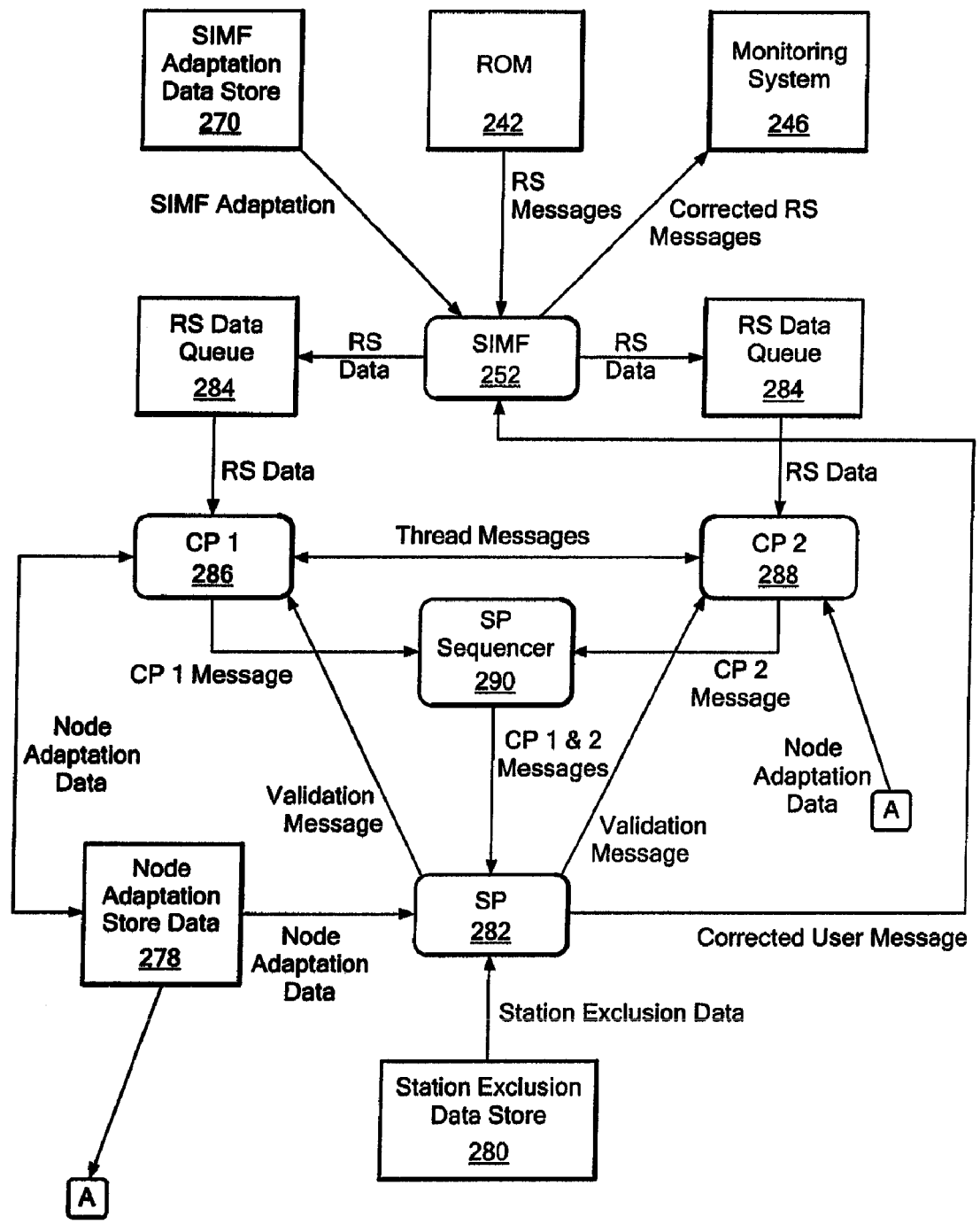
FIG. 6 is a diagrammatic view of a data flow in a simulator.

FIG. 6 is the data flow diagram of the software process and data storage for the simulator 244. The processes and data storage for the simulator 244 include a simulator front (SIMF) adaptation data store 276, a node adaptation store 278, a station exclusion data store 280, a SIMF process 282, a RS data queue 284, a first correction process (CP1) 286, a second correction process (CP2) 288, a Safety Processor (SP) sequencer process 290 and a SP process 292.

The SIMF adaptation data store 276 includes configurable parameters. One configurable parameter is an input channel addresses parameter used to support the option of receiving from the RDM 242 a SBAS/NSRS mixture of data or receiving data directly from the SBAS reference stations. An output channel addresses parameter support sending to the monitoring system 246. An input file parameter specifies a pre-recorded simulator friendly file to playback. A start/duration times parameters specify the start time within the input file and the amount of time to playback. A delay parameter defines the delay between receiving input data and outputting the data to the correction processes. A node names/IDs parameters define the SBAS and NSRS node IDs to be input into the simulator 244. A filters parameter supports the filtering of data from each site, particularly useful for the option where the RDM 242 is not used and the data is received directly from the SBAS sites.

The node adaptation data store 278 includes the configurable parameters such as node names/IDs parameters defining all possible node names (long and short) and IDs for all sites (SBAS and NSRS); locations parameters defining antenna locations for possible sites (SBAS and NSRS); and a service volume indicator parameter defining which sites participates in the defined service volume.

The station exclusion data store 280 includes configurable parameters such as a site name/ID parameter designating a name of the site and the associated ID and a filter value parameter indicating a "True" or "False" value indicating whether to exclude the site from being part of the corrected solution.

The SIMF process 282 reads the messages from the RDM 242, SBAS sites, or recorded files and places the data into queues for the two correction processes (CP1 286 and CP2 288). The adaptable RDM channel addresses/recorded file location are read in at startup. The SIMF process 282 also reads the corrected user message and converts the data to RS data to be sent to the SMS on an adaptable channel address read in at startup. The SIMF process 282 also provides filtering based on the node IDs read in at startup; as well as, real-time filtering based on altering (adding or subtracting) the node IDs to filter when running the option without the RDM 242. The RS messages for each epoch are read in from RDM 242 on adaptable channel addresses, SBAS sites, or from a pre-recorded file. The RS Messages are converted to RS data and placed into the RS data queue. RS messages matching the node IDs of the filters read in at run-time or modified real-time will be filtered and dropped before being placed in the RS data queue when running the option without the RDM 42. The Corrected User Messages are read from the SP process, encapsulated in Corrected RS Messages, and sent to the monitoring system 246. The corrected RS messages are sent to the monitoring system 246 to display the impact of the corrections in real-time.

The RS data queue 284 includes RS data sorted by epoch. The SIMF process 282 inputs into the RS data queue and CP1 and CP2 output from the RS data queue.

CP1 286 and CP2 288 take the ranging data and ephemeris data found in the RS Data and provides corrections associated with the latency of the messages from the GPS/GEO satellites and ranging/ephemeris data in the messages. CP1 286 utilizes the data from threads A and C. CP2 288 utilizes the data from threads B and C. In order to support system 220 need for real-time execution for processing the received RS Data, the process allows for orbit determination and iono threads to execute concurrently, much like certified software. To support the movement of the NSRS 222, an adaptation file supplies, per thread, the simulator based node IDs, short and long node names, an antenna location, and service volume indicator. At startup, the node names, node IDs, antenna locations, and service volume indicators in the node adaptation data store 278 are read in to populate the site data bases.

The RS data is read from the RS data queue 284 and processed to determine the corrections (errors) for the GPS signals. The RS data contains three sets, called threads, of similar data, labeled A, B, and C, from a particular station. The corrections are based on the antenna locations found in the node adaptation data store 278, the latency of the messages and the ranging/ephemeris information within the data. The CP1 and CP2 processes monitor the three threads of data found in the RS data. If one of the threads is absent, then thread messages are sent between CP1 and CP2 to determine an agreed upon set of threads to get the ranging and ephemeris data. The corrections are based on two threads of data. If two out of the three threads of data are missing, then the remote station is considered unusable. The NSRS 222 data found in the RS data are considered in the thread processing.

The validation message occurs once a second and confirms the previous message matches the previously sent message and there were no errors in transmission. In the simulator, the validation is always true and the message is used as a vehicle to get the corrected user message back to the correction process. The CP1 process proceeds each time the message is received by the SP. Once again, the adapted NSRS 222 data is factored into the validation message and corrected message.

CP1 messages and CP2 message contain the received user message and corrections from the iono and orbit determination threads with the correction process. Each message is sent to the SP Sequencer process 290 to merge the CP1 message in with the CP2 message.

The SP sequencer process 290 takes two data streams (one from CP1 286 and one from CP2 288) and merges the streams into a single stream which is sent to the SP 292. The SP sequencer process 290 also keeps the order in which the messages were sent from CP1 286 and CP2 288 in the same order sent to the SP 292. For example, the SP sequencer merges CP1 messages with CP2 messages and sends the merged messages to the SP 292.

The SP 292 receives the merged CP1 and CP2 message. The data in the merged message is validated and a corrected user message is generated and sent to the monitoring system 246 through simulator 244. At startup, data is read from a station exclusion data store. The configurable parameters are particular useful when the RDM 242 is not used to exclude data from sites. At startup, the data is read from the node adaptation data store 278 to populate the node database (SBAS and NSRS).

CP1 and CP2 messages are read from the SP Sequencer process. The measurements from the two CPs are compared for validity and integrity and a new user message is created based on the data. The corrections in the new user message incorporate the data from the SBAS and remote mobile stations; as well as, any site data filtering from the RDM 242, exclusion lists, or other filters. A validation message is sent to the CPs with the newly corrected user message and an indication of the messages matching the received message. A corrected user message, which incorporates the measurements from all unfiltered sites (SBAS and remote mobile stations), is sent to the simulator 244 for output to the SMS.

Figure 7:
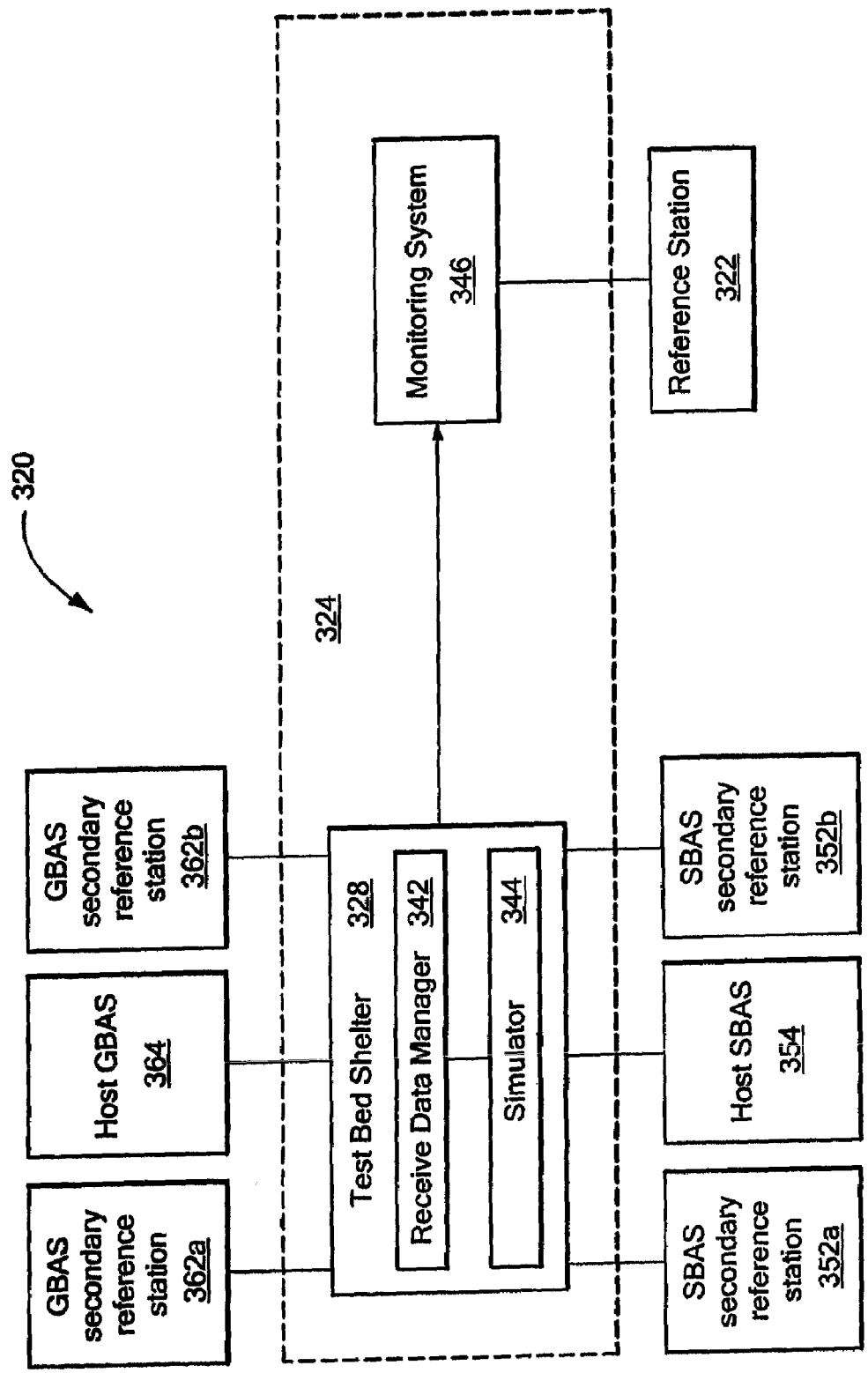
FIG. 7 is a diagrammatic view of the system with a host SBAS and a host GBAS.

Referring to FIG. 7, in a further embodiment, the system 320 includes a local reference station 322, an evaluation system 324, SBAS secondary reference stations (e.g., an SBAS secondary reference station 352a and an SBAS secondary reference station 352b), a host SBAS 354, GBAS secondary reference stations (e.g., a GBAS secondary reference station 362a and a GBAS secondary reference station 362b) and a host GBAS 364. The evaluation system 324 includes a monitoring system 346 and a shelter 328. The shelter 328 includes a RDM 342 and a simulator 344.

The system 320 may be used to demonstrate and evaluate GBAS capabilities in conjunction with an existing or enhanced SBAS service to determining the benefits of either adding SBAS secondary reference stations 352a and 352b to the host SBAS 354 and/or to determine value of adding GBAS service to a given region including adding secondary reference stations 362a and 362b to the host GBAS 364. This capability allows optimization and trade-off analysis to be conducted for determining the quantities and locations for GBAS secondary reference stations within the area or region of interest in a non-intrusive manner with the host GBAS.

The secondary SBAS reference stations 352a and 352b and the GBAS reference stations 362a and 362b are portable and can be located at any geographic location of interest. If communication lines are not present within 300 meters of a desired site, a very small aperture terminal (VSAT) or other types of data communications are possible to support the low data rate communication (<64 kb/sec.) between the secondary reference stations and the shelter 328.

Figure 8:
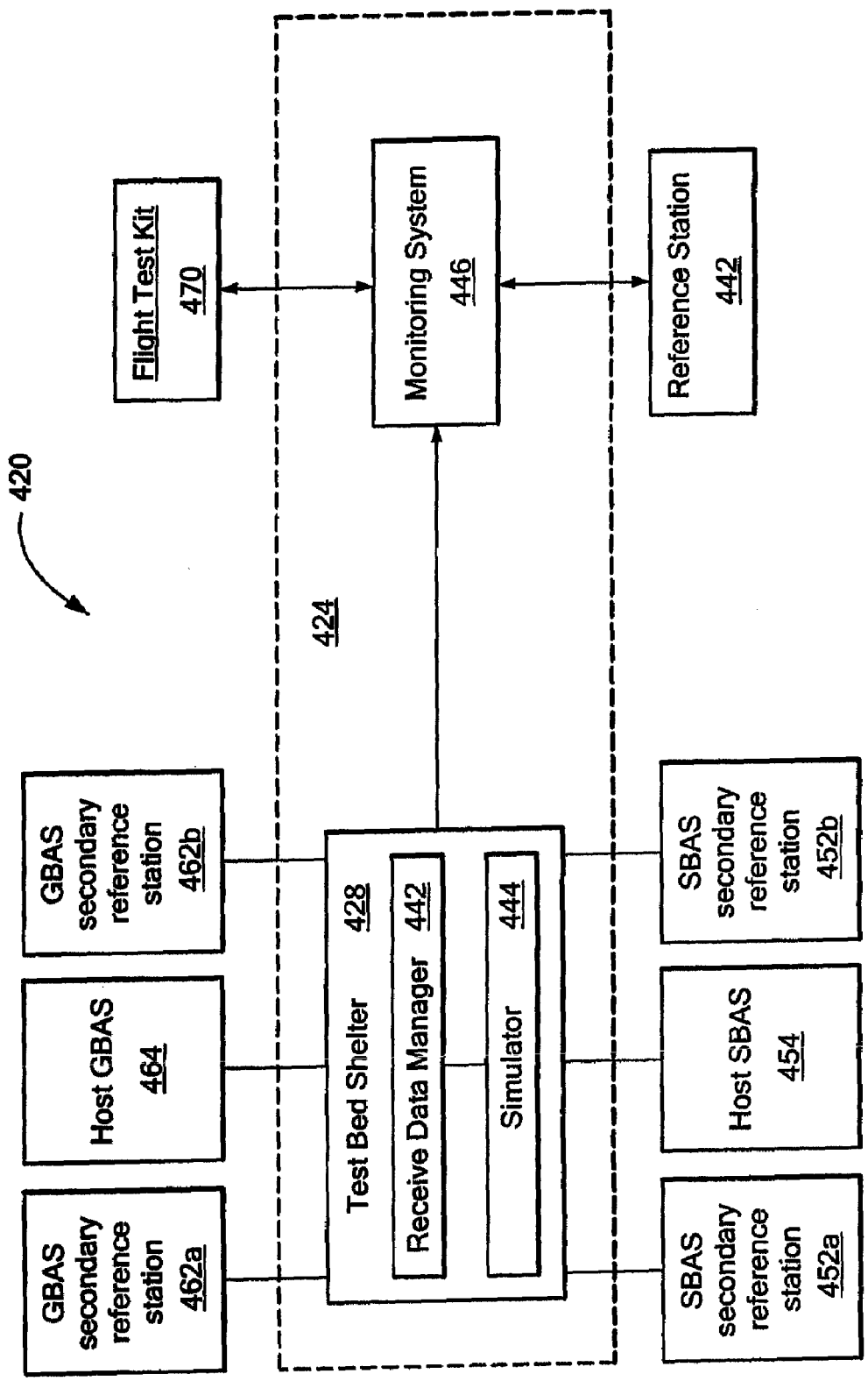
FIG. 8 is a diagrammatic view of the system with a flight test kit.

Referring to FIG. 8, in a still further embodiment, the system 420 includes a local reference station 422, an evaluation system 424, SBAS secondary reference stations (e.g., an SBAS secondary reference station 452a and an SBAS secondary reference station 452b), a host SBAS 454, GBAS secondary reference stations (e.g., a GBAS secondary reference station 462a and a GBAS secondary reference station 462b), a host GBAS 464 and a flight test kit 470. The evaluation system 424 includes a monitoring system 446 and a shelter 428. The shelter 428 includes a RDM 442 and a simulator 444. The flight test kit 470 is located aboard an aircraft (not shown) and connected to avionics in the aircraft.

In one embodiment, flight test kit 470 enables a flight demonstration and GBAS data link coverage evaluation capability. The system 420 includes a common VHF Data Broadcast (VDB) capability that contains both SBAS and GBAS corrections and integrity information.

In other embodiments, a custom pallet is provided containing flight test kit 470 may be installed in the aircraft to receive and conduct both SBAS and GBAS based aircraft approaches. The flight test kit 470 merges both SBAS and GBAS capability into a single flight test kit entity. For example, when an aircraft is performing successive "touch-and-go's" (i.e., landing and takeoffs), the aircraft can select to perform a GBAS category (CAT) 1 (limited visibility) approach, an SBAS CAT 1 (limited visibility) approach, an SBAS vertical guidance type II (APV II) approach, an SBAS APV I approach, an SBAS Non-Precision approach, and an unaugmented RAIM based Non-Precision Approach without any equipment modifications or test setup reconfigurations.

In other embodiments, flight test kit 470 may be used in a civil aviation environment to assess flight risk. In addition, the flight test kit 470 may be used to detect navigation signals in local areas so that a user may monitor the navigation information from the aircraft during the landing or approach or whatever phase of flight the aircraft is coding. In other examples, a user of system 420 may use flight test kit 470 to monitor the navigation signals received at the aircraft and reproduce that information at the evaluation system 424 much like reference station 422, but in the aircraft using same signal the aircraft would receive while in flight.

The system described herein is not limited to use with the hardware and software described above. The system can be implemented in digital electronic circuitry, or in computer hardware, firmware, software, or in combinations thereof.

The system can be implemented, at least in part, via a computer program product (i.e., a computer program tangibly embodied in an information carrier (e.g., in a machine-readable storage device or in a propagated signal) for execution by, or to control the operation of, data processing apparatus (e.g., a programmable processor, a computer, or multiple computers)). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with implementing the system can be performed by one or more programmable processors executing one or more computer programs to perform the functions of the system. All or part of the system can be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A system for assessing a navigation augmentation environment, comprising:
    a reference station for receiving messages from a satellite, the reference station located at a site having a known position;
    a simulator for simulating an augmentation system by determining corrections based on the messages received and the known position of the reference station;
    a monitoring system to render the corrections to a user in a form enabling determination of the usability of the augmentation system in the navigation augmentation environment; and
    a receive data manager configured to receive the messages from different sources using different formats, the receive data manager being configured to format the messages into a common format.

2. The system of claim 1 wherein simulating the augmentation system comprises simulating the augmentation system using software having the same functionality as software from the augmentation system.

3. The method of claim 1 wherein the reference station is configured to be moved to other sites having known positions in order to determine which site is a preferred site for a permanent reference station.

4. The system of claim 1, wherein the received data manager is configured to filter messages from one or more different sources.

5. The system of claim of claim 1 wherein:
    the receive data manager stores the messages received; and
    the simulator is configured to receive stored messages or live messages.

6. The system of claim 1 wherein the reference station is a first reference station, and further comprising:
    a second reference station being associated with a host satellite-based augmentation system (SBAS) and being connected to the receive data manager;
    wherein the receive data manager receives corrections from the host SBAS for evaluating the usability of the second reference station.

7. The system of claim 6, further comprising a third reference station being associated with a host ground-based augmentation system (GBAS) and being connected to the receive data manager;
    wherein the receive data manager receives corrections from the host GBAS for evaluating the usability of the third reference station.

8. The system of claim 7, further comprising a flight test apparatus located within an aircraft for receiving corrections from the host SBAS and the host GBAS.

9. The system of claim 7, wherein the one or more different sources is selected from a group consisting of the first reference station, the second reference station, the third reference station, the host GBAS and the host SBAS.

10. The system of claim 1, wherein the reference station comprises:
    an omni-directional antenna for receiving the messages;
    a receiver for decoding the messages from radio frequency (RF) messages into digital messages;
    a processor for filtering the digital messages; and
    a frequency clock connected to the receiver for synchronizing with the satellite.

11. A system for assessing a navigation augmentation environment, comprising:
    a first reference station configured to receive messages from a satellite, the reference station located at a site having a known position;
    a simulator configured to simulate an augmentation system by determining corrections based on the messages received and the known position of the reference station;
    a monitoring system configured to render the corrections to a user in a form enabling determination of the usability of the augmentation system in the navigation augmentation environment; and
    a second reference station being associated with a host ground-based augmentation system (GBAS) and being connected to a receive data manager;
    wherein the receive data manager receives corrections from the host GBAS for evaluating the usability of the second reference station.

12. A method for assessing a navigation augmentation environment, comprising:
    receiving satellite messages at a reference station located at a site having a known position;
    simulating an augmentation system by determining corrections based on the satellite messages received and the known position of the reference station;

rendering the corrections to a user in a form enabling determination of the usability of the augmentation system in the navigation augmentation environment;

receiving the satellite messages from different sources using different formats; and configuring the satellite messages into a common format.

13. The method of claim 12 wherein simulating the augmentation system comprises simulating the augmentation system using software having the same functionality as software from the augmentation system.

14. The method of claim 12, further comprising:
moving the reference station to other sites; and
determining which site is a preferred site for a permanent reference station.

15. The method of claim 12 wherein receiving comprises filtering messages from one or more different sources.

16. The method of claim of claim 12, further comprising:
storing the satellite messages received; and
sending stored satellite messages or live messages to the simulator.

17. The method of claim 12, wherein the reference station is a first reference station and further comprising:
receiving corrections from a host satellite-based augmentation system (SBAS);
receiving messages from a second reference station associated with the host SBAS; and
rendering data for determining the usability of the second reference station.

18. The method of claim 17, further comprising:
receiving corrections from a host ground-based augmentation system (GBAS);
receiving messages from a third reference station associated with the host GBAS and being connected to the receive manager; and
rendering data for determining the usability of the third reference station.

19. The method of claim 18, further comprising sending corrections from the host SBAS and the host GBAS to an aircraft.

20. The method of claim 17, wherein the one or more different sources is selected from a group consisting of the first reference station, the second reference station, the third reference station, the host GBAS and the host SBAS.

21. The method of claim 12, wherein the reference station is a first reference station and further comprising:
receiving corrections from a host ground-based augmentation system (GBAS);
receiving messages from a second reference station associated with the host GBAS; and
rendering data for determining the usability of the second reference station.

* * * * *

UNITED STATES PATENT AND TRADEMARK OFFICE
CERTIFICATE OF CORRECTION

PATENT NO. : 7,365,678 B2  Page 1 of 1
APPLICATION NO. : 11/290613
DATED : April 29, 2008
INVENTOR(S) : Heine et al.

It is certified that error appears in the above-identified patent and that said Letters Patent is hereby corrected as shown below:

Col. 2, line 58, delete "features. 13." and replace with -- features. --.

Col. 6, line 8, delete "station" and replace with -- stations --.

Col. 8, line 26, delete "participates" and replace with -- participate --.

Col. 8, line 65, delete "system 220 need" and replace with -- system's 220 need --.

Col. 9, line 33, delete "message" and replace with -- messages --.

Col. 9, line 51, delete "particular" and replace with -- particularly --.

Col. 10, line 48, delete "kit 470 may" and replace with -- kit 470 which may --.

Col. 10, line 53, delete "landing" and replace with -- landings --.

Col. 11, line 3, delete "using same" and replace with -- using the same --.

Col. 12, line 6, delete "of claim of claim 1" and replace with -- of claim 1 --.

Col. 13, line 17, delete "of claim of claim 12," and replace with -- of claim 12, --.

Signed and Sealed this

Sixteenth Day of September, 2008

JON W. DUDAS
*Director of the United States Patent and Trademark Office*